3,004,989
PROCESS OF MANUFACTURING GAMMA, GAMMA-DIALKYL-GAMMA-LACTONES
Robert H. Hasek and Edward U. Elam, Kingsport, Tenn., assignors to Eastman Kodak Company, Rochester, N.Y., a corporation of New Jersey
No Drawing. Filed Aug. 26, 1959, Ser. No. 836,078
4 Claims. (Cl. 260—343.6)

This invention relates to the preparation of gamma,-gamma-dialkyl-gamma-lactones.

Gamma-lactones have been prepared in the past chiefly by the dehydration of gamma-hydroxy-acids or by hydrogenation of gamma-keto-acids. For example, gamma-valerolactone is prepared at present by hydrogenation of levulinic acid. Gamma-lactones may also be prepared by heating gamma-bromo-esters either alone or with potassium hydroxide, or by gentle heating of unsaturated acids with 50% sulfuric acid.

We have discovered that gamma,gamma-dialkyl-gamma-lactones of the general formula

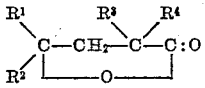

in which $R^1$ and $R^2$ are lower alkyl radicals and $R^3$ and $R^4$ are selected from the group consisting of hydrogen and lower alkyl radicals may be prepared by the acid-catalyzed rearrangement of the corresponding gamma,gamma-dialkyl-beta-lactones.

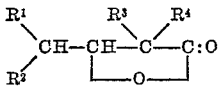

These beta-lactones may conveniently be made by condensing dialkyl-acetaldehydes with ketene or a substituted ketene in the presence of an acid or Friedel-Crafts type catalyst, by methods which have been described in detail in the literature.

The gamma,gamma-dialkyl-gamma-lactones are valuable solvents, and useful intermediates for the preparation of pyrrolidones, chloro acids, thio acids, and other organic compounds.

Acidic reagents which are effective in catalyzing the isomerization of beta-lactones to gamma-lactones include strong acids such as sulfuric, phosphoric, and p-toluene-sulfonic acids, and strongly acidic salts such as zinc chloride, aluminum chloride, boron trifluoride and the like. Since these are the catalysts which are usually employed for the condensation of ketenes with aldehydes, it is frequently possible to use the catalyst remaining in the crude reaction mixture from this condensation as the catalyst for the rearrangement of the beta-lactone. It is then merely necessary to heat the crude reaction mixture and distill off the gamma-lactone so formed. In many cases it is found that isomerization will occur in the absence of a catalyst at elevated temperatures, but the use of an acid catalyst generally improves the reaction rate and the yield of gamma-lactone. Excessive catalyst concentrations at high temperatures are generally undesirable because this promotes formation of large amounts of tarry and gaseous by-products.

By way of illustrating the operation of our invention, we give the following examples.

Example 1.—Three hundred grams each of p-toluene-sulfonic acid monohydrate and crude beta-isocaprolactone (ketene-isobutyraldehyde condensation product, from which unreacted aldehyde had been removed) were charged to a 1-liter flask and distilled slowly at 10 mm. Hg pressure through an efficient distilling column. Distillate was removed in approximately 100 ml. fractions; as each fraction was removed, 100 ml. of the ketene-isobutyraldehyde condensation product was charged to the distilling flask. The distillation rate was adjusted so that the entire product came over below 100° C. at 10 mm. Six distillate fractions were taken. At the end of the distillation, 105 g. of material had collected in the cold trap and 704 g. of crude gamma-lactone had distilled over. The residue in the distilling flask weighed 275 g. The crude lactone was combined with 168 g. from a similar experiment (total charge 857 g.), and redistilled at 10 mm. Hg pressure through a 1½ inch by 48 inch column packed with Podbielniak "Helipak" packing. The reflux ratio was 9:1. The yield of purified gamma-isocaprolactone (4-hydroxy-4-methyl-valeric acid gamma-lactone) boiling from 82–86° C. (10 mm.), $n_D^{20}$ 1.4338–1.4350, was 621 g. (72.4% of the charge). The product had a saponification equivalent of 113.8.

Example 2.—A mixture of 100 g. each of crude beta-isocaprolactone (ketene-isobutyraldehyde condensation product) and concentrated sulfuric acid was left standing at room temperature, after the initial exothermic reaction had subsided, for three days. The product was diluted with 200 ml. of water, 200 g. of ammonium sulfate was added, and the mixture was extracted thoroughly with ether. The extract was washed once with a little saturated ammonium sulfate solution, the ether was evaporated on the steam bath, and the residue was distilled to give, after removal of a forerun, 74 g. of gamma-isocaprolactone boiling at 89–100° C. (20 mm.), $n_D^{21.5}$ 1.4331. The product had a saponification equivalent of 115.3.

Example 3.—One hundred grams of crude beta-isocaprolactone (ketene-isobutyraldehyde condensation product, from which the unreacted isobutyraldehyde had been flash-distilled, but still containing strong acid catalyst) was heated in an autoclave to 300° C. for six hours. Distillation of the product (82.5 g.) at 10 mm. gave 54.1 g. of crude gamma-isocaprolactone, B.P. 80–90° C. (10 mm.), $n_D^{20}$ 1.4349. The crude gamma-lactone had a saponification equivalent of 116.1.

Example 4.—A 200–300 g. portion of crude beta-isocaprolactone (ketene-isobutyraldehyde condensation product) was washed with a solution of 20 g. of sodium carbonate in 100 ml. of water. The organic layer was taken up in ether and the layers were separated and filtered. The aqueous layer, which was still strongly alkaline, was extracted once with ether and the extract was combined with the original organic layer. The ether was evaporated on a steam bath, and the residue (261 g.) was heated in an autoclave for six hours to 300° C. Distillation, at 10 mm. pressure, of the product from this reaction gave, after removal of low boilers, fractions boiling at (A) 30–112° C. (96.0 g., $n_D^{20}$ 1.4378), and (B) 112–120° C. (19.2 g., $n_D^{20}$ 1.4556). Fraction (A) had a saponification equivalent of 157. This experiment indicated that the residual acids present in the crude beta-isocaprolactone (which was used as such in Example 3 but was washed with sodium carbonate to remove acidic materials in this example) had a very appreciable catalytic effect on the conversion of beta-lactone to gamma-lactone, although some rearrangement does occur in the absence of acid.

Example 5.—Two hundred fifty grams of 2,2,4-trimethyl-beta-valerolactone was added slowly with stirring to 250 ml. of concentrated sulfuric acid while the mixture was cooled to maintain the temperature between 10° and 15° C. The mixture was allowed to stand at room temperature for three hours and the resulting clear red solution was then slowly poured into one liter of water at 20–25° C. The solid which precipitated was taken up in ether and the aqueous solution was then extracted with ether. The ether extract was dried over sodium sulfate and the ether evaporated to give 202 g. of crude solid 2,2,4-trimethyl-gamma-valerolactone. This was distilled to give 17.8 g. of unreacted beta-lactone boiling at 74–85° C. at 9 mm., 131.7 g. (53% conversion) of gamma-lactone boiling at 86–88° (9 mm.), which solidified on cooling, and 40 g. of high boiler with no definite boiling point.

The above examples indicate the preferred operating conditions for our invention. Neither the concentration nor the type of acid catalyst used is critical. It is possible to carry out the isomerization in the absence of acid, provided temperatures of the order of 300° C. for several hours are used. On the other hand, it is also possible to carry out the reaction at room temperature if desired, provided large amounts of strong acid are employed.

The preferred reaction temperature lies between 0° C. and 300° C.; the preferred catalyst concentration varies with the temperature, from about 5% at 300° C. to 180% of the weight of beta-lactone employed at 0° C. In order to obtain a rapid reaction and simplify product recovery, it is usually preferable to operate at 100–150° C. with acid concentrations of 50–150%, based on the amount of beta-lactone used. The invention is operable over even wider limits, but if either the catalyst concentration or the temperature is too low, the reaction will be impractically slow.

We claim:
1. A process of preparing a gamma,gamma-lower dialkyl-gamma-lactone, which comprises treating the corresponding gamma,gamma-lower dialkyl-beta-lactone with from 180% to 5% of its weight of a strong acid at a temperature of from 0° C. to 300° C.
2. A process of preparing a gamma,gamma-lower dialkyl-gamma-lactone, which comprises treating the corresponding gamma,gamma-lower dialkyl-beta-lactone with from 150% to 50% of its weight of a strong acid, at a temperature of from 100°–150° C.
3. A process of preparing gamma-isocaprolactone which comprises treating beta-isocaprolactone with from 180% to 5% of its weight of a strong acid at a temperature of from 0° C. to 300° C.
4. A process of preparing 2,2,4-trimethyl-gamma-valerolactone which comprises treating 2,2,4-trimethyl-beta-valerolactone with from 180% to 5% of its weight of a strong acid at a temperature of from 0° C. to 300° C.

References Cited in the file of this patent
UNITED STATES PATENTS
2,361,036    Kung _____ Oct. 24, 1944

OTHER REFERENCES
Gresham et al.: Jour. Amer. Chem. Soc., vol. 72, p. 72 (1950).

UNITED STATES PATENT OFFICE

CERTIFICATE OF CORRECTION

Patent No. 3,004,989          October 17, 1961

Robert H. Hasek et al.

It is hereby certified that error appears in the above numbered patent requiring correction and that the said Letters Patent should read as corrected below.

Column 2, line 53, after "1.4556)." insert -- Fraction (A) has a saponification equivalent of 124.5. --; same line 53, for "Fraction (A)" read -- Fraction (B) --.

Signed and sealed this 3rd day of April 1962.

(SEAL)
Attest:

ERNEST W. SWIDER
Attesting Officer

DAVID L. LADD
Commissioner of Patents